United States Patent Office 3,005,806
Patented Oct. 24, 1961

3,005,806
HYDROCARBON RESINS
Morton Fefer, Metuchen, N.J., assignor to Esso Research and Engineering Company, a corporation of Delaware
No Drawing. Filed Oct. 31, 1958, Ser. No. 770,941
4 Claims. (Cl. 260—82)

This invention relates to a method for improving the softening properties of hydrocarbon resins prepared by polymerizing unsaturated hydrocarbon-containing streams with a Friedel-Crafts type catalyst. More particularly this invention relates to a method for improving the softening point of such a resin without any substantial color degradation by carrying out the polymerization of the unsaturated hydrocarbon stream in the presence of bicyclo (2.2.1) hepta-2,5-diene.

Petroleum resins can be produced from certain unsaturated petroleum refinery streams which contain various mixtures of acyclic and cyclic olefins and diolefins by contact with a Friedel-Crafts type catalyst under relatively low temperatures, e.g., −30° to +90° C. The hydrocarbon mixtures obtained by steam cracking petroleum oils have been found to be especially useful for this purpose. These distillates are prepared by cracking petroleum fractions such as kerosene, gas oil, naphtha or residua in the presence of large amounts of steam, e.g., 50 to 90 mole percent at temperatures of approximately 1,000° to 1,600° F. This steam cracking process is well known in the art and literature. The cracked liquid fraction boiling largely below $C_9$ ordinarily contains small amounts of cyclopentadiene monomers, e.g., 3 to 5%, which are usually at least partially removed by thermal treatment of the fraction to cause dimerization of the cyclodiene. The cyclodienes may be left in the fraction if it is desired. These resins are useful for the preparation of floor tiles, in paints, for varnish manufacture or the like. In general, various steam-cracked hydrocarbon streams such as described above and more particularly below may be employed. For example, a resin may be prepared from feed stocks having a relatively wide boiling range, e.g., 15° to 130° C. Typical analyses of such a wide boiling steam cracked fraction are shown in the following table:

TABLE I

*Steam cracked naphtha fraction boiling between 15° to 130° C.*

| Component | Approximate boiling range, °C. | Specific example weight percent | General range weight percent |
|---|---|---|---|
| $C_5$ | 15 to 50 | 19 | 10 to 30 |
| $C_6$ fraction | 50 to 70 | 22 | 10 to 40 |
| $C_7$ fraction | 70 to 100 | 44 | 30 to 55 |
| $C_8$+ fraction | 100 to 130 | 15 | 8 to 25 |

The fractions recited in Table I above comprise a mixture of various diolefins, olefins, paraffins and aromatics.

Table II shows the various components of the fractions listed above.

TABLE II

*Weight percent [1]*

| Fraction | Olefins | | Diolefins | | Paraffins | | Aromatics | | Other hydrocarbons | |
|---|---|---|---|---|---|---|---|---|---|---|
| | Specific | General | Specific | General | Specific | General | Specific | General | Specific | General |
| $C_5$ fraction | 60 | 40 to 80 | 18 | 10 to 30 | 23 | 10 to 35 | 0 | 0 to 5 | 0 | 0 to 2 |
| $C_6$ fraction | 75 | 45 to 85 | 9 | 2 to 20 | 8 | 2 to 20 | 0 | 0 to 10 | 8 | 0 to 10 |
| $C_7$ fraction | 15 | 5 to 25 | 20 | 5 to 30 | 10 | 5 to 20 | 2 55 | 30 to 70 | 0 | 0 to 10 |
| $C_8$+ fraction | 0 | 0 to 2 | 0 | 0 to 2 | 0 | 0 to 2 | 3 60 | 30 to 90 | 40 | 20 to 60 |

[1] Each fraction totals 100%.
[2] Benzene.
[3] Toluene.

As noted from the above table, the wide cut steam-racked fraction comprises substantial amounts of olefinic compounds with small amounts of diolefins. This wide cut may be used as such or, if desired, a narrow fraction, e.g., $C_5$ containing steam, which comprises approximately 60% olefins and 17% diolefins may be employed. Bicycloheptadiene is substantially absent from even the wide boiling fraction since this compound is never formed in the steam cracking operation.

It is desirable for many uses, e.g., in floor tiles, to obtain resins having relatively high softening points. The prior art has suggested the inclusion of various components with the hydrocarbon feed. Also it has been suggested to polymerize a second component in the presence of the finished resin. It has been suggested, for example, that divinyl benzene and cyclopentadiene be added to the resin feed for the purpose of increasing the softening point. These additives, while satisfactory for the purposes intended, create problems and have some adverse affects on the resin. With divinyl benzene additive, the stability, i.e., shelf life, is decreased somewhat, and with cyclopentadiene there is accompanying the increase in softening point a degradation in color and odor stability.

It has now been found that if a quantity of bicyclo (2.2.1) hepta-2,5-diene is added to the feed, the resultant resin will have a markedly improved softening point with substantially no accompanying degradation of color and/or odor. The addition of bicycloheptadiene also markedly increases the resin yield. The resins prepared with the above-noted feeds and bicycloheptadiene are more thermally stable than those prepared with the divinyl benzene cross-linking agents and as a result the shelf life for the resin of the present process is considerably longer. The bicycloheptatiene, however, must be added to the steam-cracked feed stock in certain proportions to obtain the desired results. While the concentration of bicycloheptadiene will vary according to the particular steam-cracked feed employed, in general it should be maintained between 1 to 35 wt. percent based on total feed.

It has also been found that bicycloheptadiene may be added to the reaction mixture without appreciable gel formation. With regard to gel formation it is known that cyclopentadienes will under many conditions, especially in large batch operations, effect the formation of undesirable gel, whereas the bicycloheptadiene additives does not have this effect.

The polymerization of steam-cracked petroleum hydrocarbons in the presence of bicycloheptadiene may be carried out in any conventional batch, semicontinuous or continuous fashion, all of which are well known in the petroleum resin art. The simplest technique is to add the bicycloheptadiene to the steam-cracked feed prior to its entry into the polymerization reaction vessel. However, if desired, there may be employed two separate feed streams to the polymerization reactor and the order of addition may be one of choice. For ease of control, it is preferred to feed into the reaction zone a mixture of the steam-cracked petroleum fraction and the proper concentrations of the bicycloheptadiene additive.

Insofar as the polymerization reaction to produce resins is concerned, the desired hydrocarbon mixture containing the cycloheptadienes is preferably contacted with small amounts of Friedel-Crafts catalyst such as boron trifluoride, aluminum chloride, aluminum bromide or the like. Amounts of from 0.25 to 3.0% on the unsaturated content of the feed are preferred. The catalyst may be employed in its solid state or in solutions, slurries or complexes. For example, boron trifluoride may be complexed with ether to form an etherate in accordance with techniques known in the art and the etherate may be employed as the catalyst.

The polymerization reactions are conducted with temperatures in the range of −30° to +90° C. and preferably from +5° to +75° C. In carrying out a continuous or batch operation, there is preferably employed in inert diluent such as benzene, naphtha, paraffins, cycloparaffins or other hydrocarbon fractions preferably boiling in the range of 70° to 125° C. The diluent may be employed in amounts from 5–75% by weight based on the olefin containing feed.

In carrying out the continuous operation, the reactor is preferably charged with the mixed steam-cracked petroleum hydrocarbon feed and bicycloheptadiene in the proper proportions. The diluent may be added first, last or at the same time. The reactor should comprise means for agitating the reaction mixture and the feed containing the bicycloheptadiene is preferably agitated during the addition of the catalyst and during the entire reaction time. Preferably the catalyst is added slowly over a period of 5 minutes to one hour or until the desired catalyst concentration has been reached. The temperature of the reaction mixture may be controlled by any known technique, a particularly preferred one is referred to normally as a pumparound system where the reaction mixture is continuously circulated through a temperature-controlling bath adapted to either heat or cool the mixture. After the start up of the reaction, the catalyst is continuously added at a rate to give the desired catalyst concentration together with fresh steam-cracked hydrocarbon feed containing bicycloheptadiene.

In a continuous system, a portion of the reaction mixture is continuously drawn off to a second vessel if desired to provide additional contact time and the product is withdrawn from the second vessel either batchwise or continuously. One technique for carrying out a batch reaction comprises forming a slurry of the catalyst in diluent and then slowly adding the cracked feed and bicycloheptadiene. The mixture is continuously agitated. If desired, only a portion of the aluminum chloride is added initially and the remainder after the reaction is started. The product mixture is then quenched, washed and stripped to give the final resin product. The reaction mixture may be quenched with an acid such as dilute sulfuric or phosphoric acid to stop the reaction. Other quenches such as the non-ionic water soluble wetting agents such as the polyethylene oxides, more specifically such compounds as alkyl polyethylene oxide, alkyl phenyl polyglycols, etc. may be employed. These are all well known in the art. Subsequent to the quench, the product is water and/or caustic washed to remove any residual acidity. Subsequent to the washing, the resin solution is then stripped of diluent, unreacted hydrocarbon and any low molecular weight polymer to give the hard resin product. The stripping may be carried out in accordance with well-known techniques by vacuum or steam distillation. For example, hard resins are conveniently recovered by stripping to a bottoms temperature to about 270° C. at 2–5 mm. Hg or the solution may be steam stripped for about 2 hours at 260° C. While the softening point may be raised by increasing the severity and/or time of stripping, this only results in relatively small increases in softening point and is accompanied by a loss in resin yield with a corresponding increase in undesired liquid polymer.

A single reactor may be employed in lieu of the two reactors described above; however, in this case the single reactor will preferably comprise several stages.

For a more complete understanding of this invention, reference is now had to the following examples:

EXAMPLE 1

One hundred grams of benzene were added to a reaction flask with 3 grams of $AlCl_3$. The mixture was stirred into a slurry and then 160 grams of a steam-cracked naphtha fraction boiling in the range of 15° to 50° C. and containing about 17% diolefin, 60% olefin, 1% paraffin and 22% $C_6+$ together with 40 grams of bicycloheptadiene were added. Temperature in the reaction mixture was maintained with 30°–35° C. for a period of about 2 hours with agitation. The reaction product was then withdrawn, quenched with 30 cc. of a .16 wt. percent aqueous solution of an alkyl polyether and washed with aqueous sodium carbonate 10 wt. percent solution. The entire reaction mixture was then stripped of diluent, unreacted hydrocarbons and low molecular weight polymer. The product was stripped in a column with a bottoms temperature of 270° C. at 3 mm. Hg. The analyses follow:

| | Weight percent |
|---|---|
| Resin | 54.5 |
| Raffinate | 38.5 |
| Fill [1] | 7 |

[1] Low molecular weight polymer.

The actual softening point of the resin was 99° C.

The resin product in accelerated resin aging tests at 125° F. did not show any appreciable degradation over a period of 4,000 hours and the odor of the resin, which was slight immediately after being formed, remained slight during this period.

Resins were prepared as in Example 1 without adding bicycloheptadiene and after about 4,000 hours the odor had degraded to a value of 4, employing a scale of zero to 4. The resin of Example 1 had an odor rating of 2 after about the same aging period.

To demonstrate the comparative effectiveness of the bicycloheptadiene reactant, reference is now had to Table III which shows a resin prepared from a steam-cracked petroleum fraction without bicycloheptadiene and with various concentrations of bicycloheptadiene. The resin feed employed is the same as in Example 1.

TABLE III

| Run | A | B | C | D |
|---|---|---|---|---|
| Operating conditions blend, gms | 200 | 180 | 170 | 160 |
| Bicycloheptadiene added, gms | | 20 | 30 | 40 |
| AlCl₃, gms | 3 | 3 | 3 | 3 |
| Diluent, gms. (benzene) | 100 | 100 | 100 | 100 |
| Temperature, °C | 30–35 | 30–35 | 30–35 | 30–35 |
| Reaction time, hrs | 2 | 2 | 2 | 2 |
| Products, gms.: | | | | |
| Resin (yield) | 77.3 | 95 | 101 | 106 |
| Raffinate | 196.5 | 184 | 179 | 172 |
| Fill | 10.5 | 15 | 14 | 14 |
| Resin inspections: Softening point, °C. (actual) | 71 | 86.5 | 92 | 99 |

It will be noted that aside from the improvement in softening point properties of the resin prepared with bicycloheptadiene, there is an appreciable increase in yield of resin product employing this additive. Thus, in Run A 200 grams of steam-cracked petroleum feed without bicycloheptadiene yielded 85 grams of resin, in comparison to a yield of 95–106 grams of product employing 200 grams of combined steam-cracked petroleum fraction and bicycloheptadiene.

What is claimed is:

1. A process for preparing resins which comprises contacting a feed comprising about 65 to 99 wt. percent of an unsaturated $C_5$ to $C_{8+}$ hydrocarbon fraction boiling within the range of about 15 to 130° C. composed of 10–30 wt. percent of a $C_5$ fraction having the following composition:

| | Percent by weight |
|---|---|
| $C_5$ olefins | 40 to 80 |
| $C_5$ diolefins | 10 to 30 |
| $C_5$ paraffin hydrocarbons | 10 to 35 |
| $C_5$ aromatic hydrocarbons | 0 to 5 |
| Other $C_5$ hydrocarbons | 0 to 2 |

10–40 wt. percent of a $C_6$ fraction having the following composition:

| | |
|---|---|
| $C_6$ olefins | 45 to 85 |
| $C_6$ diolefins | 2 to 20 |
| $C_6$ paraffin hydrocarbons | 2 to 20 |
| $C_6$ aromatic hydrocarbons | 0 to 10 |
| Other $C_6$ hydrocarbons | 0 to 10 |

30–55 wt. percent of a $C_7$ fraction having the following composition:

| | |
|---|---|
| $C_7$ olefins | 5 to 25 |
| $C_7$ diolefins | 5 to 30 |
| $C_7$ paraffin hydrocarbons | 5 to 20 |
| $C_7$ aromatic hydrocarbons | 30 to 70 |
| Other $C_7$ hydrocarbons | 0 to 10 |

8–25 wt. percent of a $C_8$ fraction having the following composition:

| | |
|---|---|
| $C_{8+}$ olefins | 0 to 2 |
| $C_{8+}$ diolefins | 0 to 2 |
| $C_{8+}$ paraffin hydrocarbons | 0 to 2 |
| $C_{8+}$ aromatic hydrocarbons | 30 to 90 |
| Other $C_{8+}$ hydrocarbons | 20 to 60 | and about 1 to 35 wt. percent of bicycloheptadiene with a Friedel-Crafts catalyst.

2. A process for preparing a petroleum resin which comprises passing to a reaction zone a feed comprising about 65 to 99 wt. percent of an unsaturated $C_5$ to $C_{8+}$ steam-cracked petroleum stream boiling within the range of about 15 to 130° C. composed of 10–30 wt. percent of a $C_5$ fraction having the following composition:

| | Percent by weight |
|---|---|
| $C_5$ olefins | 40 to 80 |
| $C_5$ diolefins | 10 to 30 |
| $C_5$ paraffin hydrocarbons | 10 to 35 |
| $C_5$ aromatic hydrocarbons | 0 to 5 |
| Other $C_5$ hydrocarbons | 0 to 2 |

10–40 wt. percent of a $C_6$ fraction having the following composition:

| | |
|---|---|
| $C_6$ olefins | 45 to 85 |
| $C_6$ diolefins | 2 to 20 |
| $C_6$ paraffin hydrocarbons | 2 to 20 |
| $C_6$ aromatic hydrocarbons | 0 to 10 |
| Other $C_6$ hydrocarbons | 0 to 10 |

30–55 wt. percent of a $C_7$ fraction having the following composition:

| | |
|---|---|
| $C_7$ olefins | 5 to 25 |
| $C_7$ diolefins | 5 to 30 |
| $C_7$ paraffin hydrocarbons | 5 to 20 |
| $C_7$ aromatic hydrocarbons | 30 to 70 |
| Other $C_7$ hydrocarbons | 0 to 10 |

8–25 wt. percent of a $C_8$ fraction having the following composition:

| | |
|---|---|
| $C_{8+}$ olefins | 0 to 2 |
| $C_{8+}$ diolefins | 0 to 2 |
| $C_{8+}$ paraffin hydrocarbons | 0 to 2 |
| $C_{8+}$ aromatic hydrocarbons | 30 to 90 |
| Other $C_{8+}$ hydrocarbons | 20 to 60 | and about 1 to 35 wt. percent of bicycloheptadiene, contacting said feed in said reaction zone with a Friedel-Crafts catalyst at a temperature of about −30 to 90° C., and agitating the resulting mixture until a petroleum resin is formed.

3. A process for preparing a petroleum resin which comprises passing to a reaction zone a feed comprising about 65 to 99 wt. percent of a $C_5$ hydrocarbon fraction containing olefins and diolefins boiling between about 15 and 50° C. composed of 10–30 wt. percent of a $C_5$ fraction having the following composition:

| | Percent by weight |
|---|---|
| $C_5$ olefins | 40 to 80 |
| $C_5$ diolefins | 10 to 30 |
| $C_5$ paraffin hydrocarbons | 10 to 35 |
| $C_5$ aromatic hydrocarbons | 0 to 5 |
| Other $C_5$ hydrocarbons | 0 to 2 |

10–40 wt. percent of a $C_6$ fraction having the following composition:

| | |
|---|---|
| $C_6$ olefins | 45 to 85 |
| $C_6$ diolefins | 2 to 20 |
| $C_6$ paraffin hydrocarbons | 2 to 20 |
| $C_6$ aromatic hydrocarbons | 0 to 10 |
| Other $C_6$ hydrocarbons | 0 to 10 |

30–55 wt. percent of a $C_7$ fraction having the following composition:

| | |
|---|---|
| $C_7$ olefins | 5 to 25 |
| $C_7$ diolefins | 5 to 30 |
| $C_7$ parafin hydrocarbons | 5 to 20 |
| $C_7$ aromatic hydrocarbons | 30 to 70 |
| Other $C_7$ hydrocarbons | 0 to 10 |

8–25 wt. percent of a $C_8$ fraction having the following composition:

| | |
|---|---|
| $C_{8+}$ olefins | 0 to 2 |
| $C_{8+}$ diolefins | 0 to 2 |
| $C_{8+}$ paraffin hydrocarbons | 0 to 2 |
| $C_{8+}$ aromatic hydrocarbons | 30 to 90 |
| Other $C_{8+}$ hydrocarbons | 20 to 60 | and about 1 to 35 wt. percent of bicycloheptadiene, contacting said feed in said reaction zone with a Friedel-Crafts catalyst at a temperature of about −30 to 90° C.

and agitating said resulting mixture until a petroleum resin is formed.

4. A process for preparing a petroleum resin which comprises passing to a reaction zone a feed comprising about 65 to 99 wt. percent of an unsaturated $C_5$ to $C_{8+}$ hydrocarbon fraction boiling between about 15 and 130° C. and having the following composition—

| Component: | Weight percent |
|---|---|
| $C_5$ fraction | 10–30 |
| $C_6$ fraction | 10–40 |
| $C_7$ fraction | 30–55 |
| $C_{8+}$ fraction | 8–25 | and about 1 to 35 wt. percent of bicyclo (2.2.1) hepta-2,5-diene, contacting said feed in said reaction zone with aluminum chloride catalyst at a temperature between about 5 and 75° C., agitating the resulting mixture until a petroleum resin is formed, withdrawing the resin from said reaction zone, stripping the lower boiling impurities from the reaction product and recovering a petroleum resin having good color, good odor and a high softening point.

References Cited in the file of this patent

UNITED STATES PATENTS

| 2,698,841 | McKay | Jan. 4, 1955 |
| 2,750,353 | Mirviss et al. | June 12, 1956 |
| 2,750,359 | Hamner et al. | June 12, 1956 |
| 2,798,865 | Banes et al. | July 9, 1957 |